United States Patent
McNeely (10) Patent No.: US 8,777,291 B2
(45) Date of Patent: Jul. 15, 2014

(54) MOTORCYCLE WINDSCREEN AND FAIRING SYSTEM USING SAME

(71) Applicant: Roadawgz, Inc., Ben Lomond, CA (US)

(72) Inventor: Ryan McNeely, Santa Cruz, CA (US)

(73) Assignee: Roadawgz, Inc., Ben Lomond, CA (US)

( * ) Notice: Subject to any disclaimer, the term of this patent is extended or adjusted under 35 U.S.C. 154(b) by 0 days.

(21) Appl. No.: 13/661,702

(22) Filed: Oct. 26, 2012

(65) Prior Publication Data

US 2013/0154301 A1    Jun. 20, 2013

Related U.S. Application Data

(60) Provisional application No. 61/553,087, filed on Oct. 28, 2011.

(51) Int. Cl.
*B62J 17/00* (2006.01)
*B62J 17/04* (2006.01)

(52) U.S. Cl.
CPC ...................................... *B62J 17/04* (2013.01)
USPC ........................................................ 296/78.1

(58) Field of Classification Search
CPC ...... Y02E 10/721; Y02E 10/725; B62J 17/04; B62J 17/02; F05B 2240/13
USPC ........... 296/78.1, 84.1, 180.1, 180.2, 217, 91, 296/180.5, 85; 290/55; 280/288.4
See application file for complete search history.

(56) References Cited

U.S. PATENT DOCUMENTS

| | | | | |
|---|---|---|---|---|
| 3,787,088 A * | 1/1974 | Dreyer, Sr. | ................... | 296/78.1 |
| 4,135,758 A * | 1/1979 | Clements | ..................... | 296/78.1 |
| 4,770,460 A * | 9/1988 | Miura et al. | ................. | 296/78.1 |
| 4,911,494 A * | 3/1990 | Imai et al. | .................... | 296/78.1 |
| 5,072,987 A * | 12/1991 | Allen | ....................... | 296/107.09 |
| 5,416,315 A * | 5/1995 | Filipovich | ............... | 250/214 VT |
| 5,855,404 A * | 1/1999 | Saunders | ..................... | 296/78.1 |
| 6,158,671 A * | 12/2000 | Kodaira et al. | ............ | 239/284.2 |
| 6,203,093 B1 * | 3/2001 | Suzuki et al. | ................ | 296/78.1 |
| 7,007,998 B2 * | 3/2006 | Toyofuku | ..................... | 296/78.1 |
| 7,032,948 B2 * | 4/2006 | Khan | ........................... | 296/78.1 |
| 7,080,929 B2 * | 7/2006 | Uemoto et al. | ............... | 362/475 |
| 7,748,746 B2 * | 7/2010 | Beiber Hoeve et al. | ...... | 280/835 |
| 8,123,273 B2 * | 2/2012 | Tsuda et al. | .................. | 296/78.1 |
| 8,454,075 B2 * | 6/2013 | Hayashi et al. | .............. | 296/78.1 |
| 2007/0040407 A1 * | 2/2007 | Salisbury | ..................... | 296/78.1 |
| 2009/0021582 A1 * | 1/2009 | Nakaya | ......................... | 348/148 |
| 2010/0301627 A1 * | 12/2010 | Kern | ............................ | 296/78.1 |
| 2011/0317441 A1 * | 12/2011 | Yasuhara et al. | .............. | 362/473 |
| 2013/0057016 A1 * | 3/2013 | Yamada | ........................ | 296/78.1 |
| 2013/0081896 A1 * | 4/2013 | Nakamura | .................... | 180/229 |

* cited by examiner

*Primary Examiner* — Kiran B Patel (57) ABSTRACT

A wind screen adapted for use with a motorcycle fairing. The windscreen may be adapted to be removed from the fairing. The windscreen may have a physical configuration adapted to reduce wind on a rider sitting in a more upright position, and to minimize flutter of the windscreen. The windscreen may be adapted to mount in a plurality of configurations.

6 Claims, 10 Drawing Sheets

MOTORCYCLE WINDSCREEN AND FAIRING SYSTEM USING SAME

CROSS-REFERENCE TO RELATED APPLICATIONS

This application claims priority to U.S. Provisional Patent Application No. 61/533,087 to McNeely, filed Oct. 28, 2011, which is hereby incorporated by reference in its entirety.

BACKGROUND

1. Field of the Invention

The present invention relates to a windscreen for adapted for use with a motorcycle fairing.

2. Description of Related Art

Windscreens for small motorcycle fairings, such as a quarter fairing, typically are quite small in order to avoid the negative aspect of vibration of the windscreen above its supported area. A motorcycle is capable of high speeds, and the resulting high wind velocity over the windscreen may cause significant oscillation of any wind screen that extends above a fairing.

A typical wind screen for a smaller fairing represents more of a clear section in the fairing, through which the driver can see through, than a raised wind screen. Especially with a motorcycle adapted for high speed, a typical fairing will be securely attached around three full sides of the wind screen.

What is called for is a windscreen, and a windscreen and fairing system, which allows for extension of the wind screen higher into the space above the fairing, and which can deflect more wind away from the motorcycle rider, especially a more upright rider. What is also called for is a windscreen and fairing system which can extend higher up above the fairing without being susceptible to vibrations and oscillations which may be caused by high speed wind flow.

SUMMARY

A wind screen adapted for use with a motorcycle fairing. The windscreen may be adapted to be removed from the fairing. The windscreen may have a physical configuration adapted to reduce wind on a rider sitting in a more upright position, and to minimize flutter of the windscreen. The windscreen may be adapted to mount in a plurality of configurations.

DETAILED DESCRIPTION

Figure 1:
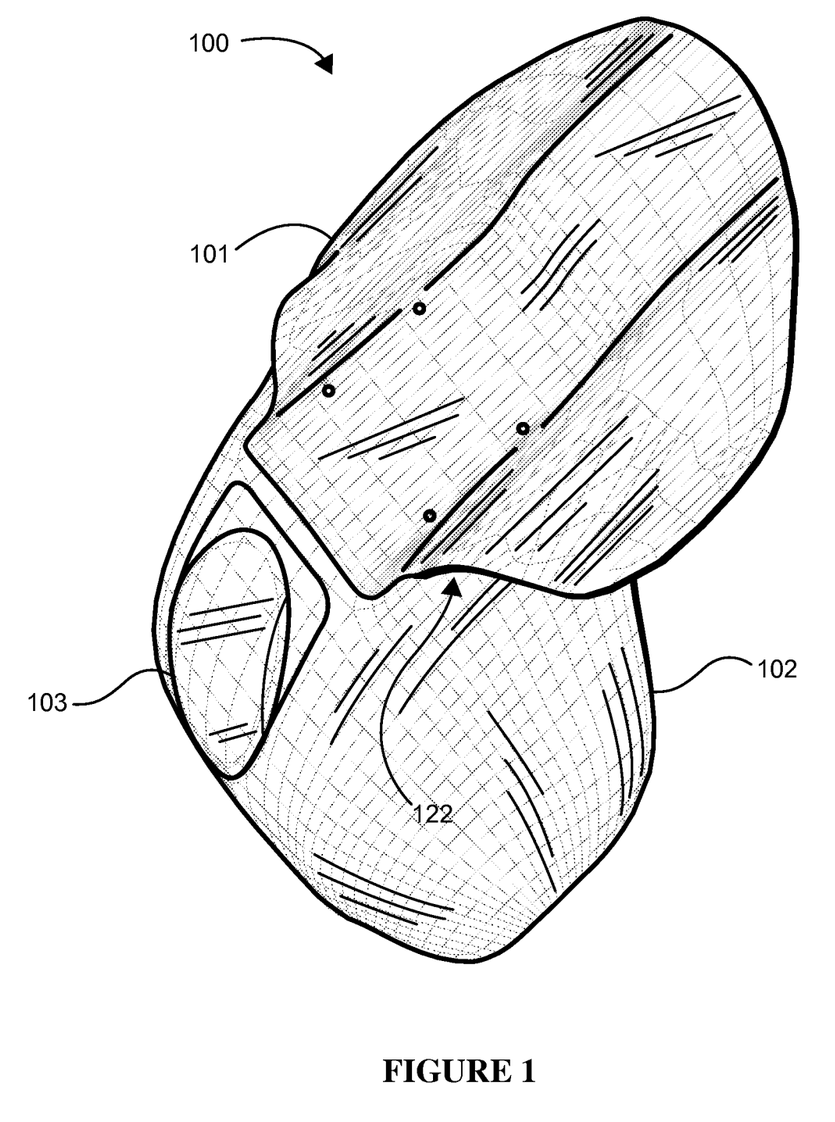
FIGS. 1 is a perspective view of a windscreen and fairing system according to some embodiments of the present invention.

FIG. 1 illustrates a windscreen and fairing system 100 according to some embodiments of the present invention. A motorcycle fairing 102 is seen with its headlight 103. The windscreen 101 is mounted on the fairing 102. The fairing 102 may be a small fairing which does not extend up into the area of the front of the chest of an upright fairing, such as is the case with a quarter fairing. In some embodiments, the windscreen 101 is adapted to be removable and replaceable. The windscreen 101 may be adapted to substitute in for a smaller windscreen. The windscreen 101 may be adapted to provide for more wind deflection around the rider while incorporation features that also reduce vibration.

The windscreen 101 may be adapted to mount in a first configuration in a lower position and a second configuration in a raised position. The windscreen 101 may be adapted to be easily removable and replaceable, and in some aspects may be able to be interchanged with a different, and/or smaller windscreen.

Figure 2:
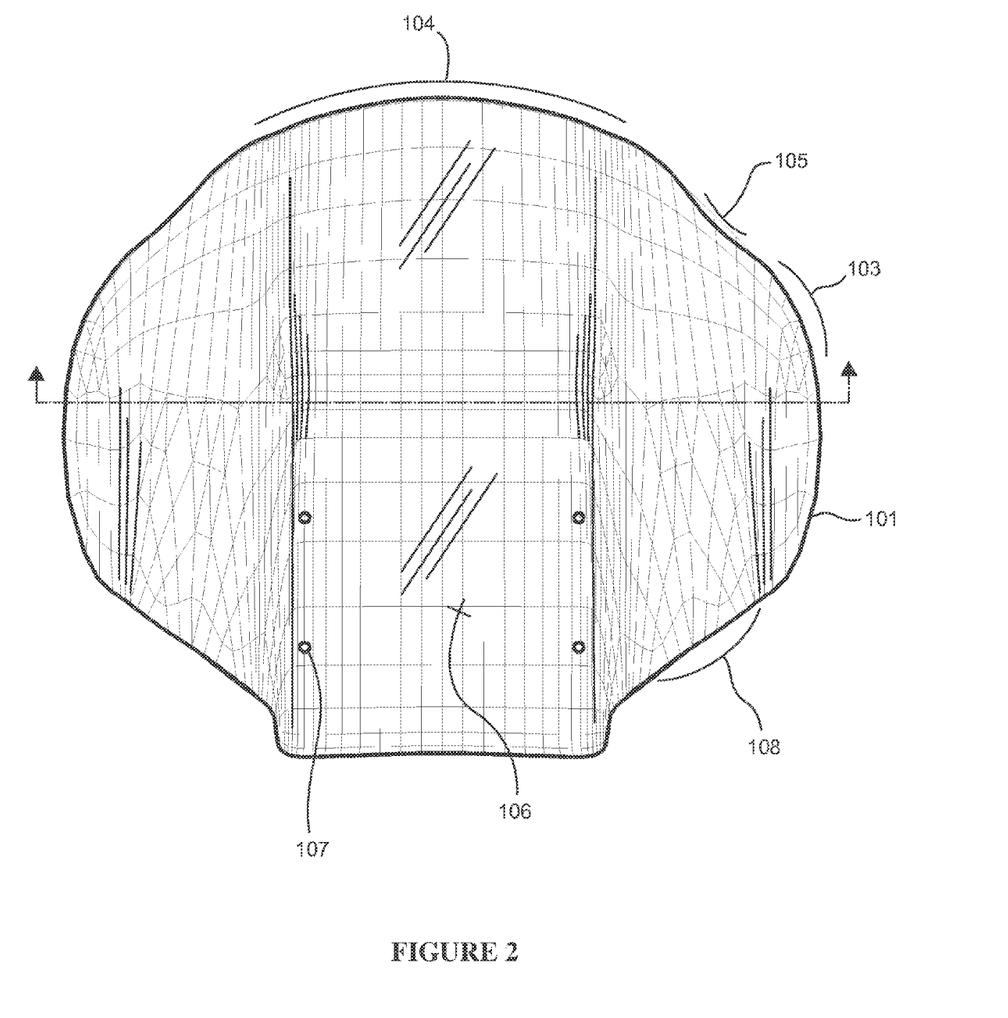
FIG. 2 is a front view of a windscreen according to some embodiments of the present invention.

FIGS. 2-7 illustrate a windscreen 101 according to some embodiments of the present invention. FIG. 2 illustrates a front view of a windscreen 101 adapted to mount to a fairing. A mounting portion 106 may include mounting holes 107. The mounting portion 106 may be adapted to allow for the mounting of the windscreen 101 to a recess in a motorcycle fairing.

The windscreen 101 may include a first set of bulb outs 103 around the sides of the windscreen 101. The top 104 of the windscreen 101 may be of a larger radius than the bulb outs 103. The top 104 of the windscreen 101 may be separated from the bulb outs 103 by an inset 105.

In some embodiments, the windscreen 101 may be of a polycarbonate material. In some embodiments, the windscreen may be of a clear material. In some embodiments, the windscreen may be of a tinted material. In some embodiments, the windscreen may be of a polycarbonate material approximately $\frac{1}{10}^{th}$ of an inch thick.

Figure 3:
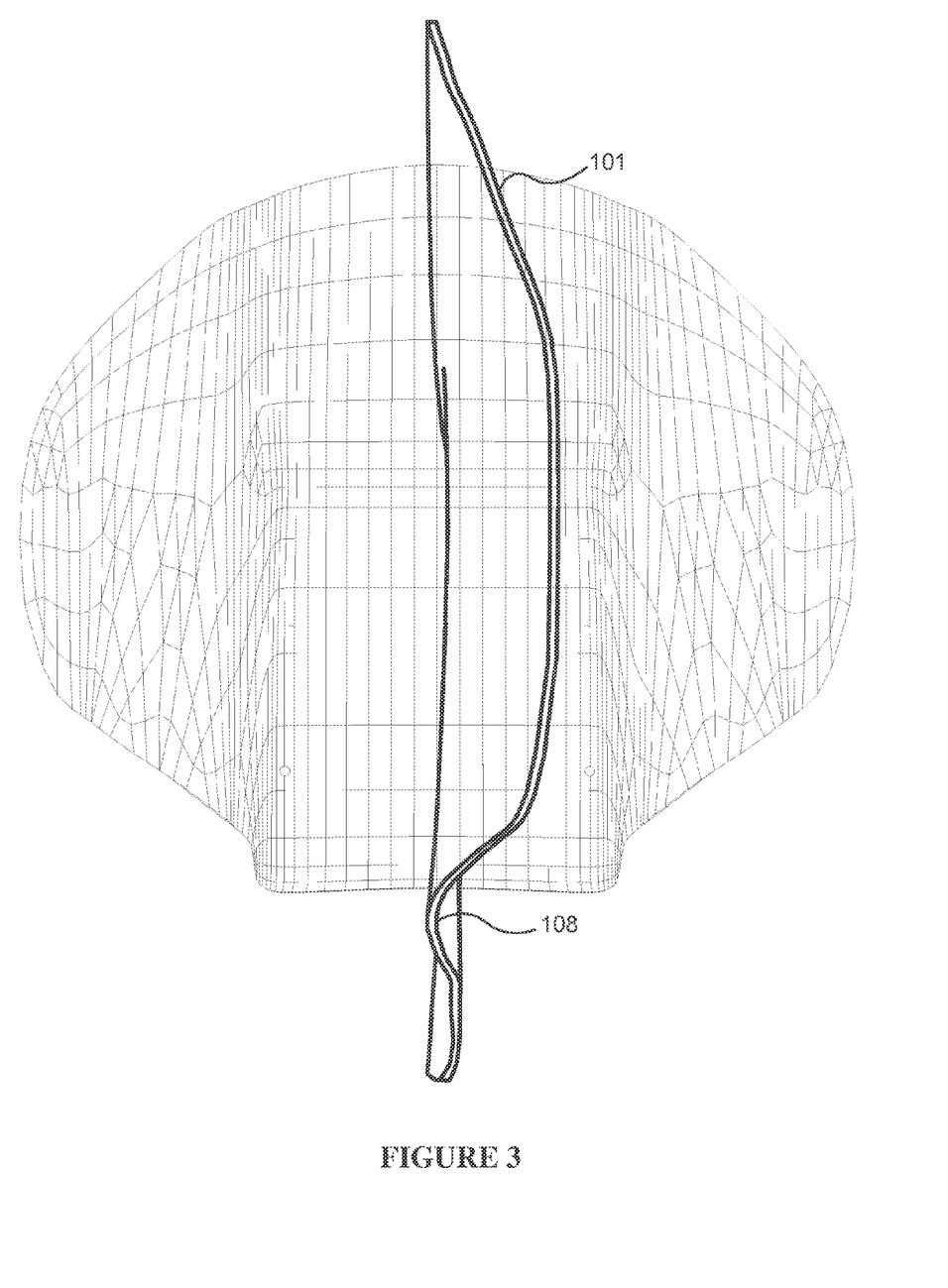
FIG. 3 is a side view of a windscreen according to some embodiments of the present invention.

FIG. 3 illustrates the windscreen 101 in side view. The windscreen 101 is seen to have a portion 108 which is adapted to leave a gap 122, as seen in FIG. 1, adapted to allow for some airflow between the windscreen 101 and the fairing 102. In some aspects, the gap 122 and the resulting airflow between the windscreen 101 and the fairing 102 may reduce the vibration in the windscreen 101 during operation while mounted on a motorcycle. The upper portion 110 of the windscreen 101 may be above a bend 111 which is adapted to allow the upper portion 110 to redirect airflow over the head of a user. In conjunction with the bulb outs 103, and the top 104, these features are adapted to better deflect wind around the head and shoulders of a rider of the motorcycle. The bend 111 may increase the rigidity of the windscreen with regard to the wind load seen when used on a motorcycle in forward motion. In addition, the airflow through the gap areas 108 may increase the air pressure behind the windscreen and make the wind screen less susceptible to flutter, and to vibration due to wind loading.

In some embodiments, the wind screen may have slits in the areas of the bulb outs adapted to allow some air to flow through to the back of the wind screen. This air flow may stabilize the air pressure behind the wind screen and reduce the likelihood of flutter, or vibration, of the wind screen when in use.

Figure 4:
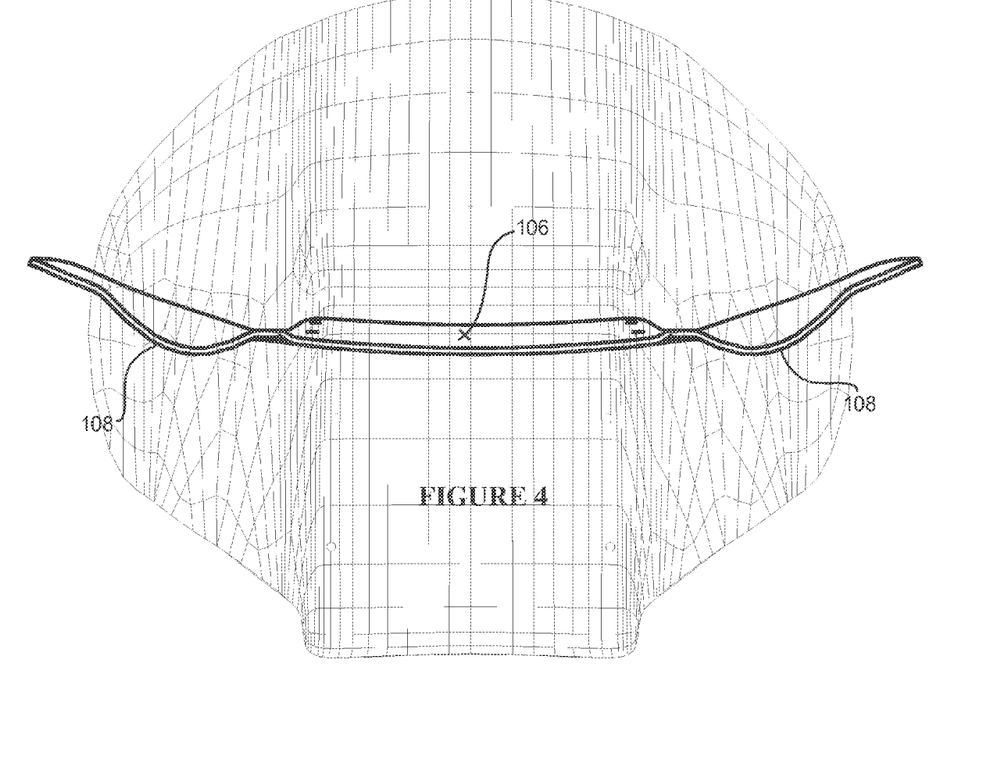
FIG. 4 is a bottom view of a windscreen according to some embodiments of the present invention.
Figure 5:
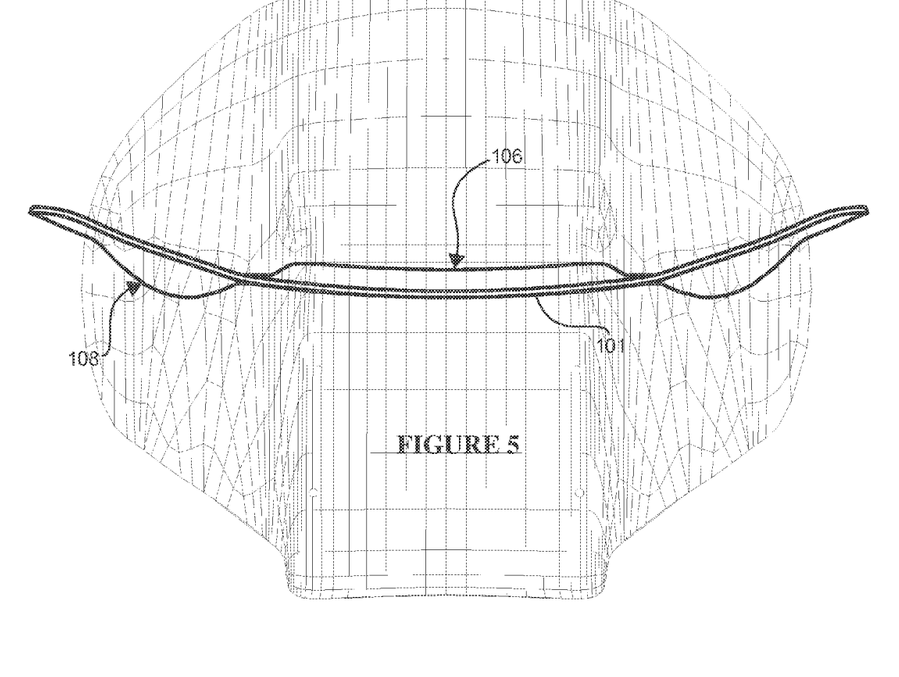
FIG. 5 is a top view of a windscreen according to some embodiments of the present invention.
Figure 6:
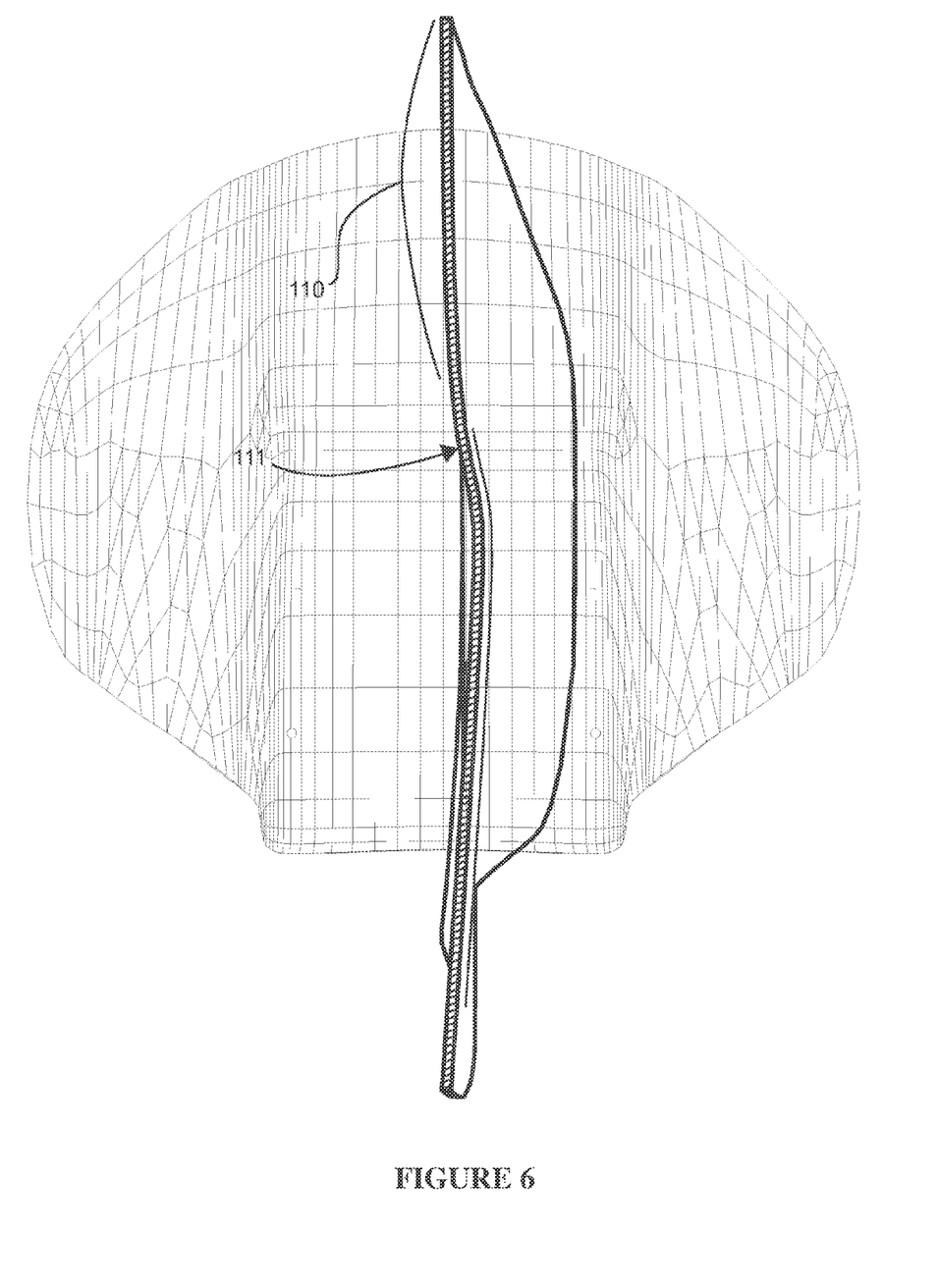
FIG. 6 is a cross-sectional view of a windscreen according to some embodiments of the present invention.
Figure 7:
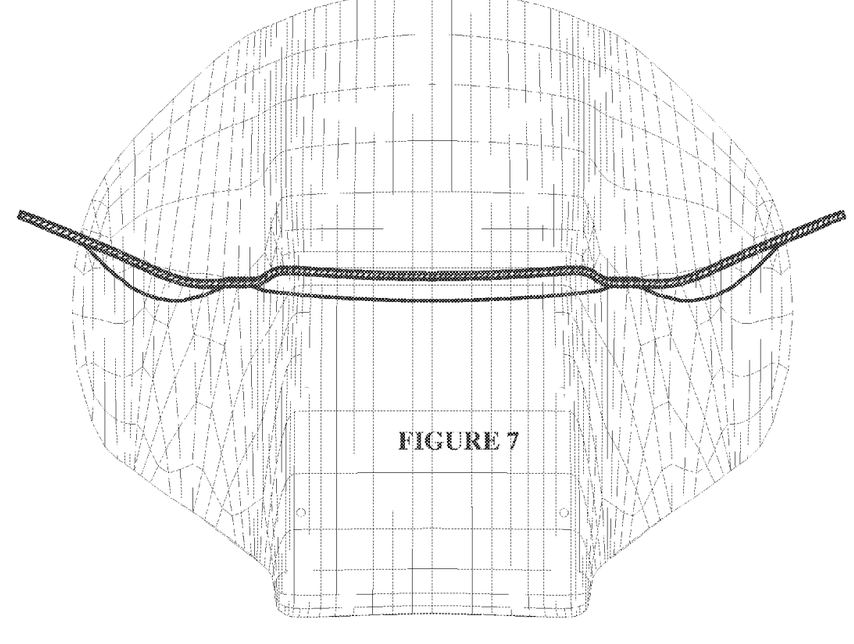
FIG. 7 is a cross-sectional view of a windscreen according to some embodiments of the present invention.

FIGS. 4 and 5 illustrate bottom and top views, respectively, of the windscreen 101. As seen in FIG. 4, bulb outs 108 are adapted to allow some air flow between the windscreen 101 and the fairing 102. In some embodiments, the bulb outs are more pronounced, with the adjacent area of the fairing not having a depression, or a significant depression. In some embodiments, the fairing and the windscreen, in their joint design, have an airflow channel such that a portion of the air flow channel results from a depression in the fairing. In such a case, the bulb out in the wind screen may not be as pronounced.

Figure 8:
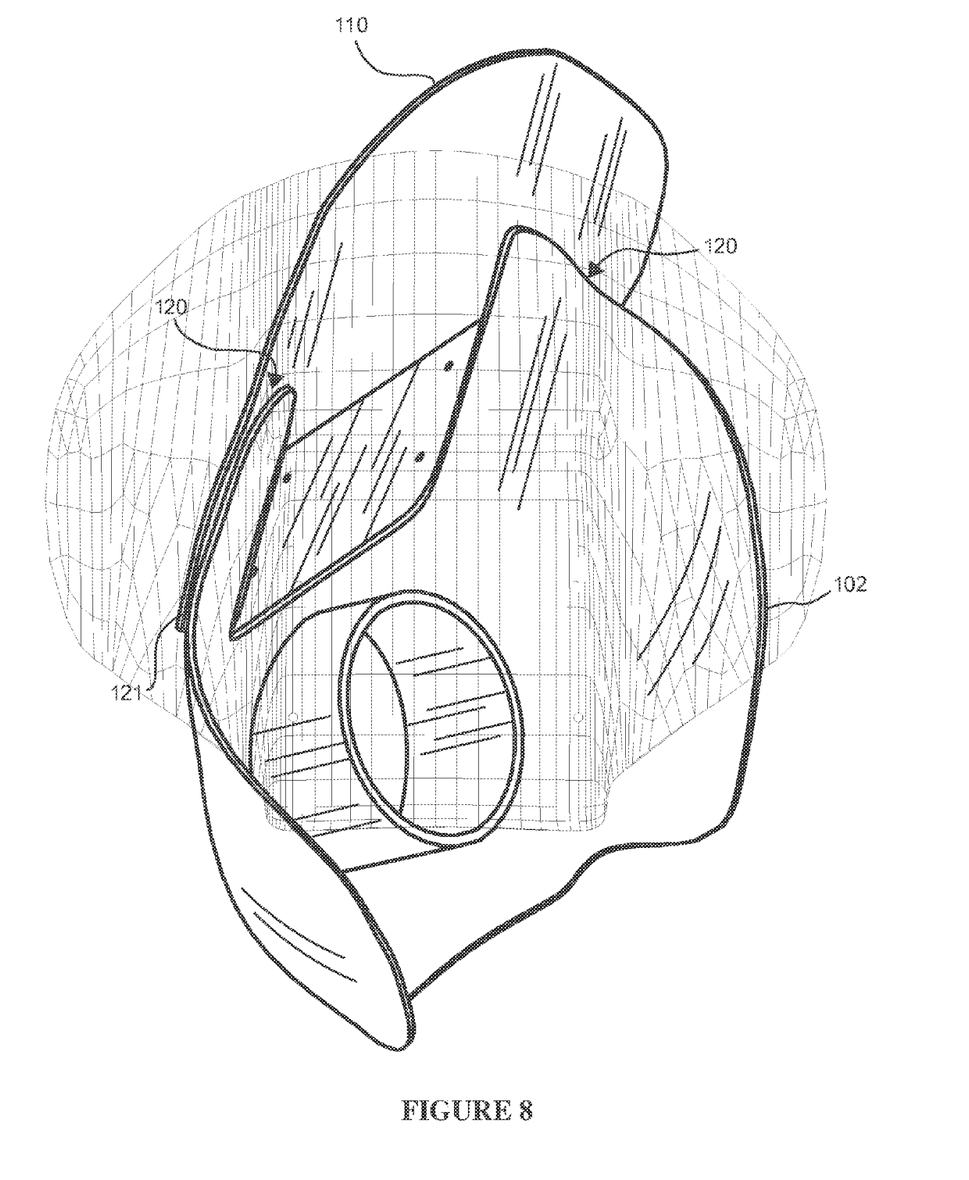
FIG. 8 is a raised rear perspective view of a windscreen and fairing system according to some embodiments of the present invention.
Figure 9:
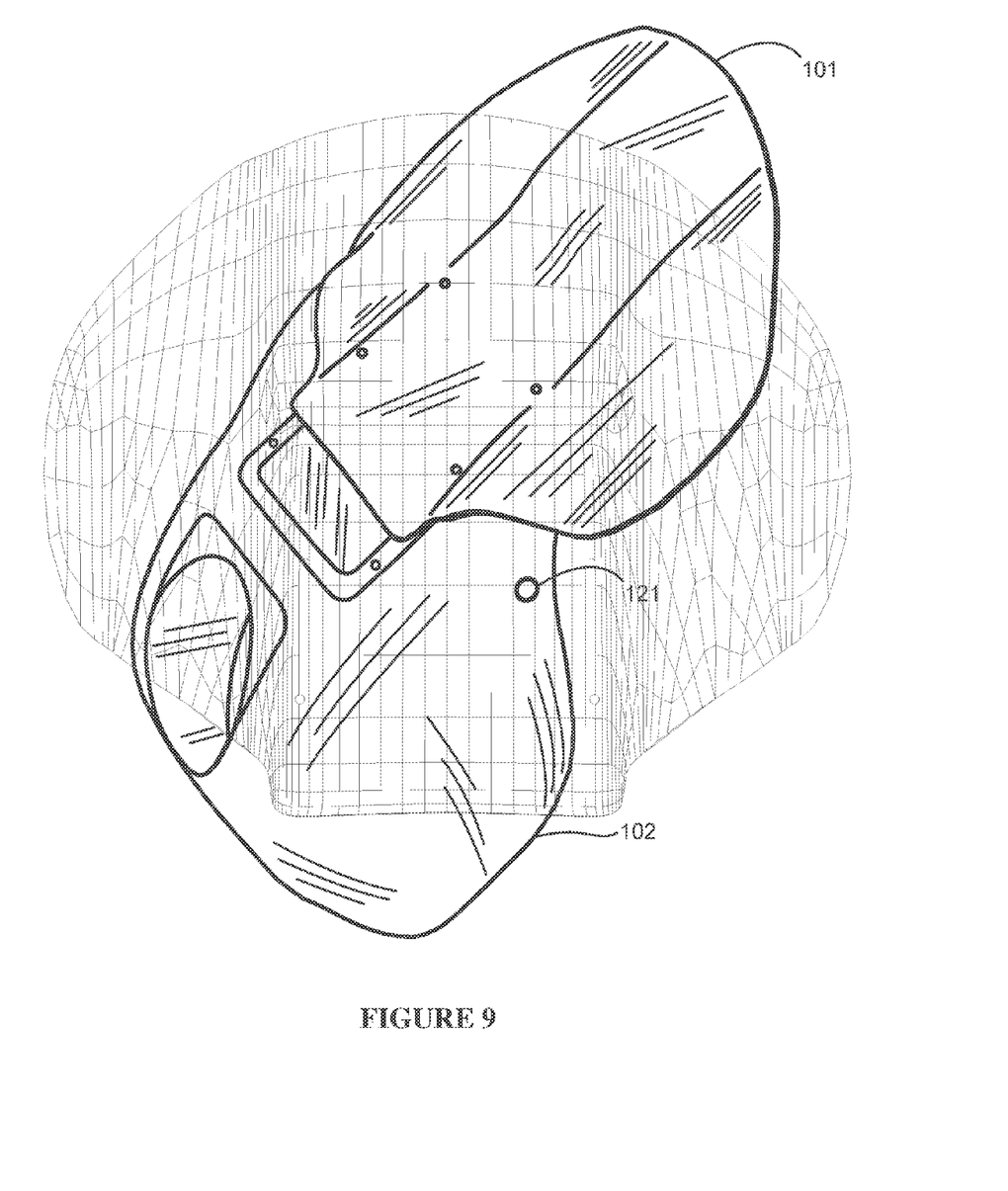
FIG. 9 is a perspective view of a windscreen and fairing system in a second configuration according to some embodiments of the present invention.

FIG. 8 illustrates a rear perspective view of a windscreen and fairing system 100 according to some embodiments of the present invention. The windscreen 101 is mounted onto the fairing 102. The fairing 102 is adapted to be mounted onto a motorcycle, which is not shown for clarity. The windscreen 101 may have a bulb out portion which overlays a portion of the fairing, and is adapted to leave a gap 122, as seen in FIG. 1, to allow for some airflow between the windscreen 101 and the fairing 102. In some aspects, the gap 122 and the resulting airflow between the windscreen 101 and the fairing 102 may reduce the vibration in the windscreen 101 during operation while mounted on a motorcycle. The airflow may exit in a region 120 that is behind the windscreen. A bumper 121 may be attached to the fairing, or to the windscreen. The bumper is adapted to provide a support for the portion of the wind screen 101 which overlays the fairing. The bumper may provide a support that reduces vibrations of the windscreen. In some embodiments, the bumper is mounted onto the fairing. When the wind screen 101 is moved from the first lower configuration to a higher second configuration, the bumper may remain in its location on the fairing. In some embodiments, the horizontal periphery of the wind screen, out past the bulb out region, may be fastened to the fairing.

In some embodiments, the wind screen 101 is adapted to mount in a plurality of positions. The wind screen 101 may have four mounting holes, and the fairing may have two sets of four mating mounting interfaces. In some embodiments, the wind screen may have eight mounting holes. This allows the fairing to be moved from a first lower configuration to a second higher configuration with a minimum of holes in the wind screen 101.

Figure 10:
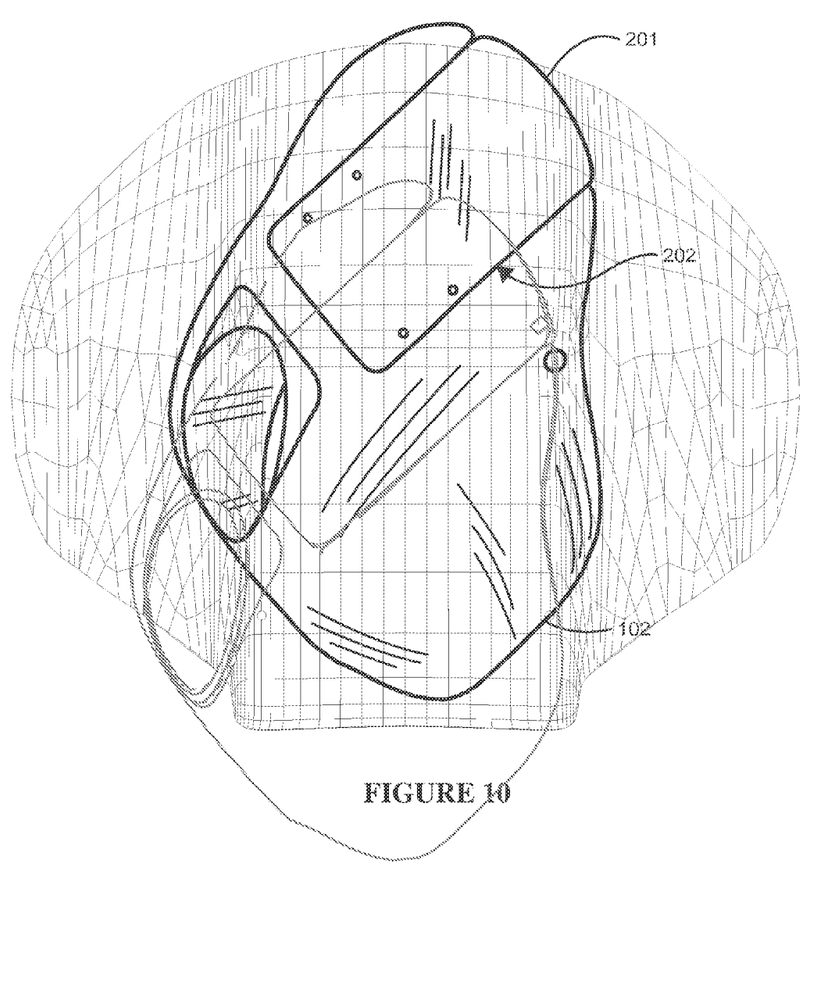
FIG. 10 is a perspective view of a windscreen and fairing system with a standard wind screen.

FIG. 10 illustrates a small windscreen 201 mounted into the receiver of the fairing. In contrast to the wind screen 101 described in embodiments above, the small wind screen 201 is adapted to reside within a receiving depression in the fairing 102 such that the edge of the small windscreen 201 lines up 202 with the fairing 102. With the wind screen 101 described in embodiments above there is an overlay of the sides of the wind screen 101 over portions of the fairing, and the associated wind flow. The wind screen 101 described above is well suited to replace the small windscreen 201, which may be a standard windscreen with some fairings. A kit comprising of the fairing 102, the small wind screen 201, and the wind screen 101 may allow a user to easily replace, or interchange, wind screens depending upon the type of wind screen the user desires, without having to change the fairing.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A wind screen for a motorcycle fairing, said wind screen comprising:
   a central mounting area;
   a first bulb out along a first side, said first bulb out having a first radius;
   a second bulb out along a second side, said second bulb out having said first radius; and
   a raised top area, said raised top area having a second radius, wherein said second radius is larger than said first radius.

2. The wind screen of claim 1 wherein said wind screen further comprises:
   a first raised area below said first bulb out; and
   a second raised area below said second bulb out,
wherein said first raised area and said second raised area are adapted to allow air flow under said first side and said second side of said wind screen, respectively.

3. The wind screen of claim 1 wherein said wind screen further comprises a bend above its central mounting area, wherein said bend is a forward bend.

4. The wind screen of claim 2 wherein said wind screen further comprises a bend above its central mounting area, wherein said bend is a forward bend.

5. The wind screen of claim 1 further comprising a plurality of mounting holes in said central mounting area.

6. The wind screen of claim 3 further comprising a plurality of mounting holes in said central mounting area.

* * * * *